United States Patent [19]

Shima

[11] Patent Number: 4,934,151

[45] Date of Patent: Jun. 19, 1990

[54] CONTINUOUS MULTISTAGE THERMAL PROCESSING APPARATUS, FREEZING CONTROL METHOD FOR USE BY THE APPARATUS, AND APPARATUS FOR PREPARING A RECORDING MEDIUM FOR THE CONTROL METHOD

[75] Inventor: Yoshisuke Shima, Tokyo, Japan

[73] Assignee: Kyokujitsu Company., Ltd., Tokyo, Japan

[21] Appl. No.: 377,056

[22] Filed: Jul. 7, 1989

[51] Int. Cl.$^5$ ............................................. F25D 17/06
[52] U.S. Cl. ........................................ 62/64; 62/52.1; 62/129; 62/208; 62/373
[58] Field of Search ................ 62/64, 78, 125, 129, 62/208, 222, 223, 52.1, 373

[56] References Cited

U.S. PATENT DOCUMENTS

| | | | |
|---|---|---|---|
| 3,109,296 | 11/1963 | Williamson et al. | 62/64 |
| 3,762,179 | 10/1973 | Jesperson | 62/223 |
| 4,107,937 | 8/1978 | Chmiel | 62/78 |
| 4,649,710 | 3/1987 | Inoue et al. | 62/223 |

Primary Examiner—Ronald C. Capossela
Attorney, Agent, or Firm—Oblon, Spivak, McClelland, Maier & Neustadt

[57] ABSTRACT

An apparatus for continuous freezing or heating process for multistage changing of the ambient temperature, in particular, an apparatus for a continuous freezing process, a freezing control method, and an apparatus for preparing a recording medium on which a program for the control method is written are disclosed.

2 Claims, 3 Drawing Sheets

CONTINUOUS MULTISTAGE THERMAL PROCESSING APPARATUS, FREEZING CONTROL METHOD FOR USE BY THE APPARATUS, AND APPARATUS FOR PREPARING A RECORDING MEDIUM FOR THE CONTROL METHOD

BACKGROUND OF THE INVENTION

The present invention relates to an apparatus for a continuous cooling or heating process for multistage changing of the ambient temperature, and, in particular, to an apparatus for a continuous freezing process.

The present invention also relates to a freezing method by use of the above apparatus which handles multistage changes in the ambient temperature, and to an apparatus for preparing a recording medium in which a program for controlling the operating conditions of method is written.

As methods for preserving foodstuffs, drying, salting, canning, retort pouching and the like are commonly known. However, in all of these methods the flavor and texture which typify the freshness are lost. On the other hand, freezing practically maintains the freshness of the food and is capable of preserving food for long periods, so can be considered as the ideal method of preservation.

Various methods of freezing preservation are known, such as air blast freezing, contact freezing, liquefied gas freezing, and the like.

In liquefied gas freezing, liquefied nitrogen or liquefied carbon dioxide, which evaporates in a short time under atmospheric pressure, is sprayed directly onto the material to be frozen, or the material is introduced into a refrigeration chamber into which the liquefied gas has been sprayed, and the material is frozen in an extremely short time. Because the freezing takes place in a very short time the quality of the resulting frozen food is good.

Liquified gas freezing is carried out by both batch and continuous processing methods. Continuous processing is superior from the aspect of productivity.

An apparatus used for continuous liquefied gas freezing is provided with a conveying member such as a net conveyor or the like which conveys the material to be frozen into a tunnel-shaped cooling chamber into which the liquefied gas is sprayed. The material is transported through the cooling chamber by the conveying member so that the material is subjected to a continuous freezing process.

However, the results obtained in this cooling process vary because of the size and heat conductivity of the material being frozen. Fish, meat agricultural products such as certain cereals including rice and the like, and food products such as cooked and frozen foodstuffs and the like vary in the frozen state because of their water content even though they are freezed under the same conditions. For that reason, with these foodstuffs, even when frozen in an atmosphere at the same temperature, the temperature of the food product does not drop uniformly. Especially between 0° C. and −5° C., the drop in the temperature of the product slows down. This region is called "maximum freezing-up temperature zone" in which the water throughout the product turns to ice so that ice crystals are formed. When freezing is retarded in this temperature region, the tissue in animal and plant products tends to break down, so that when the food product is thawed the juices in meat and the liquid in the plant cells are released and the natural fresh flavor is lost. For this reason rapid freezing is desirable. In addition to this, it is known that, in order to maintain the flavor and texture when preserving foods by freezing, there are various ideal conditions to be met.

Accordingly, the freezing conditions are established in advance and the freezing process is carried out to conform to these conditions. For example, the ambient temperature during freezing should be changed in stages so that when the temperature of the food product goes from normal temperature to 0° C. the ambient temperature is −30° C. When the product temperature reaches the 0° C. stage the ambient temperature should be changed to −100° C., and when the −7° C. level is reached in the product, −40° C. is required.

In addition, a programmed freezing method is known, in which this type of freezing data is programmed in the recording medium in advance to control the liquefied gas freezing apparatus.

When a batch device is employed, it is easy to change the freezing conditions in a multistage way depending the kind of the foodstuff, but it is difficult to do so in a continuous unit. Specifically, in the case of a batch system, the freezing ambient temperature is changed in several stages to conform to the various foodstuffs, and the processing time is changed at each ambient temperature until the foodstuff reaches the desired temperature, so that freezing occurs easily.

However, in the case of a continuous process, the chamber in which the food product is transported is divided into a plurality of sections, but even though the ambient temperature of the freezing process can be changed in each section, the processing temperature is determined by the length of the partitioned refrigeration chamber, so that when a plurality of different products are to be processed in one apparatus, there is a limitation in that the optimum freezing conditions are set to conform to the individual products.

Also, in rapid freezing at ultralow temperatures the cooling program changes for each object material. For this reason, a great deal of specialized knowledge and labor is necessary in the preparation and the control of the program.

Centered around a freezing apparatus, the fact that multistage adjustment of the environment is necessary and the problem areas at that time, have been explained above. However, the circumstances are the same for other multistage temperature processes, such as, for example, with process apparatus for continuous, multistage environment adjustment at close to normal temperatures, used in the bio-industries for cultivating seedlings or strains of microorganisms, and the like; and with process apparatus for continuous multistage heating for drying or annealing and the like.

SUMMARY OF THE INVENTION

It is therefore a first object of the present invention is to provide, with due consideration to the drawbacks of such conventional processes and apparatus, a continuous multistage thermal processing apparatus in which it is possible to change in a plurality of stages the processing temperature conditions corresponding to the properties of the object material to be processed, and where it is possible to easily set and change the processing time in each of the various stages.

A second object of the present invention is to provide an improved freezing apparatus, in particular, a liquefied gas freezing apparatus.

A third object of the present invention is to provide a freezing control method for easy control of a liquefied gas freezing apparatus at suitable freezing conditions corresponding to each individual material.

A fourth object of the present invention is to provide an apparatus for preparing a recording medium in which necessary data for the control of the freezing apparatus is written.

A fifth object of the present invention to provide a freezing system.

These objects are achieved in the present invention by the provision of one or a plurality of partition members which divide the inside of a tunnel-shaped processing chamber into small sub-chambers in the conveying direction in a continuous multistage thermal processing apparatus. By the fact that the inside of the tunnel-shaped chamber is divided into a plurality of sub-chambers and the partition members move freely in the conveying direction of the product, the length of each sub-chamber can be freely set. As a result, the control time for the ambient temperature in each of the sub-chambers can be set to the optimum time, and it is possible to control the temperature in a large number of stages at the optimum conditions for each of the products to be processed.

As result, it is possible, for example, in the case of application to a freezing apparatus for food products, to freeze commodities, meat, fish, or cereals such as rice or the like at high productivity, without loss of flavor, palatability, or texture.

The inventor of the present invention has also previously determined the necessary processing time for attaining the specified working temperature or the set ambient temperature at each freezing stage, using an adiabatic chamber provided with a liquefied gas spraying apparatus, a ambient temperature sensor, and a workpiece temperature sensor. Based on the determined values, a processing program was recorded on a data recording medium, and by controlling the freezing apparatus using this recording medium, it is possible to operate a liquefied gas freezing apparatus which performs the freezing process in many stages and changes the ambient temperatures in the many stages to carry out ultra-low temperature high speed freezing without the necessity for a great deal of specialized knowledge and labor, and it is possible to accurately perform a high quality freezing process. This system is especially suitable for control of a continuous, multistage liquefied gas freezing apparatus. It is especially suitable for an apparatus which can divide a tunnel-shaped refrigeration chamber with movable partitions into a plurality of sub-chambers of optional size.

DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE INVENTION

Figure 1A:
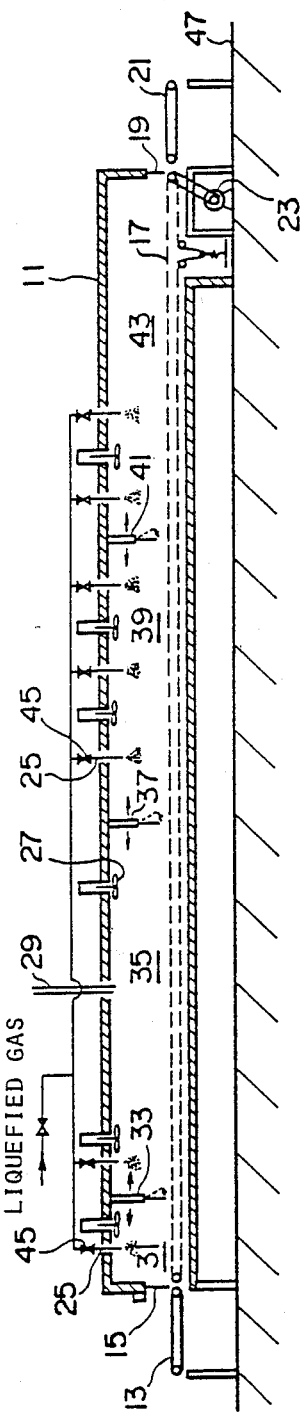
FIG. 1A is a schematic illustration in explanation of an example of a continuous liquefied gas freezing apparatus of the present invention.

Now referring to FIG. 1, an example of a continuous liquefied gas freezing apparatus will now be explained. In the figure a net conveyor 17, on which material for freezing is loaded and conveyed, is provided in a refrigeration chamber 11. This material is transported from an inlet feeder 13 onto the net conveyor 17 and discharged from an outlet feeder 21. A plurality of liquefied gas jet nozzles 25 and a plurality of mixing fans 27 are provided in the refrigeration chamber 11. For the sake of simplicity, only a few of the nozzles 25 and fans 27 have been shown on the drawings and the rest have been omitted. A material such as a food product or the like is frozen while being passed through the chamber 11. The apparatus is provided on a floor 47.

A plurality of movable partition members 33, 37 41 is provided in the refrigeration chamber 11. The partition members 33, 37, 41 divide the refrigeration chamber 11 into a plurality of sub-chambers 31, 35, 39, 43 so that the temperatures in the respective sub-chambers can be controlled separately. In addition, the partition member 33, 37, 41 are provided so that they can move in the conveying direction of the net conveyor 17 by a moving mechanism (not shown). The magnitude of each of the sub-chambers 31, 35, 39, 43 can be suitably set. For example, by considering the space or zone extending from the inlet 15 to the first partition member 33 as the first chamber 31, the zone between the first partition member 33 and the second partition member 37 as the second chamber 35, the zone between the second partition member 37 and the third partition member 41 as the third chamber 39, and the zone from the third partition member 41 to the outlet 19 as the fourth chamber 43, the ambient temperatures in the respective chambers can be controlled separately, for example, to the temperatures shown below, by adjusting the amount of liquefied gas from the liquefied gas jet nozzles 25 which enters each chamber.

First chamber 31: 60°C.
Second chamber 35: −30° C.
Third chamber 39: −100° C.
Fourth chamber 43: −40° C.

The total freezing process time can be adjusted by controlling the conveying velocity of the net conveyor 17 by a variable speed motor 23. In addition, the ratios of the processing times for each of the chambers 31, 35, 39, 43 can be adjusted by moving the partition members 33, 37, 41 and distributing and partitioning each chamber at a specified magnitude (length).

In the case where the material to be frozen is changed, the partition members 33, 37, 41 may be moved to conform to the change, the speed of the net conveyor adjusted, and the processing time in each chamber 31, 35, 39, 43 set.

A suitable shield member such as an air curtain, a hanging screen or the like is used for each of the partition members 33, 37, 41, in a range where the movement of the material is not obstructed. In FIG. 1 the partition members 33, 37, 41 are shown as door-type members, each with a lower end which swings and is pushed aside as the material being conveyed passes through. In addition, a partition member may be mounted from its base on a moving device for the member so that it can swing. All the partition members may swing, or, one piece of cloth, leather, or plastic sheet or the like which is flexible even at low temperatures, or several of these pieces together may be hung from a strip. Furthermore, when the material is not piled high, or when the vacant portions under the partition members 33, 37, 41 are small in comparison with the height of the chambers 31, 35, 39, 43 apertures may be formed in the bottom portion of each partition member so that the product can freely pass through the refrigeration chamber under the partition members 33, 37, 41, whereby it is possible to maintain a different temperature in each of the chambers 31, 35, 39, 43.

In the example described above, the explanation was given for the case where three partition members are provided and there are four separate atmospheres. However, the present invention is not limited to three partition members. Any suitable number is possible.

The foregoing explanation was also given using a continuous liquefied gas freezing apparatus as an example. However, the apparatus of the present invention can also be applied in practice in the same way to other continuous multistage thermal processing devices which use a tunnel-shaped heating chamber. Specific examples which can be given are multistage continuous atmosphere adjusting apparatus used in the bio-industries, which operate at relatively normal temperatures, and continuous multistage heat treating apparatus used for drying or annealing. Depending on the degree of refrigeration or heating, an electrical refrigeration (freezing) device, or an infrared lamp or heater, or a heat exchanger of the like can be used if suitable, instead of a liquefied gas jet nozzle.

As already outlined, even when cooling is carried out at the same ambient temperature for the same length of time, all the material is not cooled to the same temperature. There are materials which are easy to cool and materials which are difficult to cool, depending on the thermal capacity and the water content of the particular material. Accordingly, before actually freeze processing a large lot it is important that the cooling characteristics of the material be thoroughly understood. If this type of data is recorded on a recording medium even an inexperienced operator can aptly operate a freezing process by accessing this information.

Figure 2:
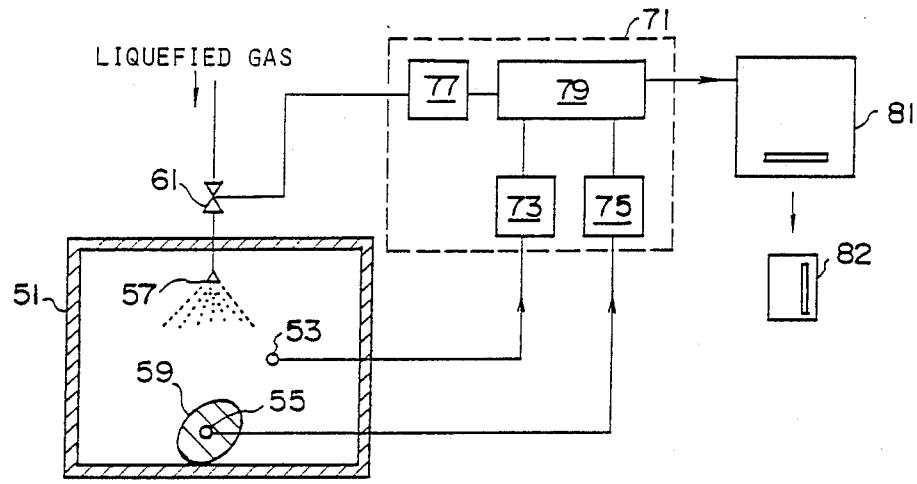
FIG. 2 is a schematic illustration in explanation of an apparatus for preparing a recording medium in which a program for controlling the operating conditions of the freezing method of the present invention is written.

FIG. 2 is a schematic illustration in explanation of an example of an apparatus for preparing a recording medium for a freezing program to be used in such a process. This apparatus comprises an adiabatic chamber 51, a controller 71, and a magnetic write device 81. A liquefied gas spraying device 57 for nitrogen or carbon dioxide gas, an ambient temperature sensor 53, and a workpiece temperature sensor 55 are provided in the adiabatic chamber 51. A workpiece 59 (object material for freezing) is shown in the figure. The workpiece 59 may be any material which can actually be frozen in a liquefied gas freezing device. An ambient temperature sensing section 73 and a workpiece temperature sensing section 75 are provided in the controller 71, and the respective sensed temperatures are compared with previously set temperatures. A solenoid valve control section 77 controls the volume of liquefied gas sprayed onto the workpiece 75 by opening and closing a solenoid valve 61 in response to a temperature detection signal from the ambient temperature sensing section 73 or the workpiece temperature sensing section 75.

A central control section 79 detects the time required for the workpiece temperature to reach a specified temperature, based on a signal from the workpiece temperature sensing section 75. This signal is transmitted to a magnetic write device (recording device) 81 and is written on a magnetic card (recording medium) 82. The time required for the ambient temperature to reach the set temperature is detected, based on the signal from the ambient temperature sensing section 73, and is also written on the magnetic card 82 in the same manner.

The processing of small lots for freezing can be handled using the same type of adiabatic chamber as shown in FIG. 2 (however, the workpiece temperature sensor is unnecessary). Specifically, magnetic cards are prepared ahead of time as necessary, using the abovementioned device, corresponding to the workpiece to be frozen. The data from these magnetic cards can be read out and utilized. The details will be later explained. However, continuous large volume production is possible with the present invention by utilizing the continuous liquefied gas freezing apparatus, and it is possible to demonstrate highly satisfactory results with this system.

As an example, an explanation will be given of a system using the continuous multistage liquefied gas freezing apparatus shown in FIG. 1, when processing under the following conditions using a magnet program card for control.

First stage (the first chamber 31) cooling . . . Cooling is started (room temperature) — switched to the second stage at an ambient temperature of $-60°$ C.

Second stage (the second chamber 35) cooling . . . Cooling is started (maintained at $-30°$ C.) — switched to the third stage when the central temperature of the workpiece reaches $0°$ C.

Third stage (the third chamber 39) cooling . . . Cooling is started (maintained at $-100°$ C.) — switched to the fourth stage when the central temperature of the workpiece reaches $-7°$ C.

Fourth stage (the fourth chamber 39) cooling . . . Cooling is started (maintained at $-40°$ C.) — terminated when the central temperature of the workpiece reaches $-30°$ C.

First, the workpiece 59, as shown in FIG. 2, is stored in the adiabatic chamber 51. The solenoid valve 61 is opened and liquefied gas is sprayed onto the workpiece 59. The elapsed time for the ambient temperature to go to $-60°$ C. is detected by the ambient temperature sensor 53 and the ambient temperature sensing section 73 and designated $t_1$.

Next, liquefied gas is sprayed in from the liquefied gas spraying device 57 to take the ambient temperature to $-30°$ C., and the elapsed time until the center of the workpiece reaches $0°$ C. from that point is detected and designated $t_2$.

After the center of the workpiece reaches $0°$ C., liquefied gas is sprayed in from the liquefied gas spraying device 57 to lower the ambient temperature to $-100°$ C., and the elapsed time until the center of the workpiece reaches $-7°$ C. is detected and designated $t_3$.

After the workpiece reaches $-7°$ C., the ambient temperature is raised to $-40°$ C., and the elapsed time until the center of the workpiece reaches $-30°$ C. is detected and designated $t_4$.

The temperatures $t_1$, $t_2$, $t_3$, and $t_4$, and in addition the data for the ambient temperatures at each cooling stage are written onto the magnetic card 82.

Figure 1B:
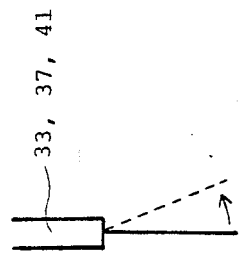
FIG. 1B is a schematic enlarged view of a partition means in the continuous liquefied gas freezing apparatus shown in FIG. 1A.

When the apparatus shown in FIG. 1 is actually operated, the operating conditions for the apparatus are determined from the data written onto the magnetic card 82. The temperatures for the chambers 31, 35, 39, 43 are adjusted to −60° C., −30° C., −100° C., and −40° C. respectively according to the amount of liquefied gas sprayed in. The lengths of the chambers 31, 35, 39, 43 are adjusted so that they are proportional to the respective freezing process times $t_1$, $t_2$, $t_3$, and $t_4$. The total freezing process time (T) can be controlled by adjustment of the variable speed motor 23. Specifically, if the lengths of the chambers 31, 35, 39, 43 are $L_1$, $L_2$, $L_3$, and $L_4$, corresponding to the times $t_1$, $t_2$, $t_3$, and $t_4$, and the total length is L, the chambers are proportioned according to the following equation.

$$L_1 = \frac{t_1}{T} \times L$$

$$L_1 = \frac{t_2}{T} \times L$$

$$L_1 = \frac{t_3}{T} \times L$$

$$L_1 = \frac{t_4}{T} \times L$$

where $T = t_1 + t_2 + t_3 + t_4$ and
$L = L_1 + L_2 + L_3 + L_4$

The partition members 33, 37, 41 are then moved and the variable speed motor 23 adjusted according to these conditions.

The settings are then made according to the data read out for the required time interval in each of the freezing stages written on the magnetic card 82, for example, by manual of by automatic setting as outlined below.

Figure 3:
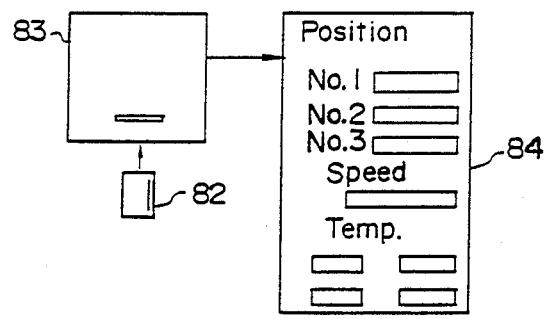
FIG. 3 and FIG. 4 are diagrams in explanation of the method used for the recording medium.

Now referring to FIG. 3, in the manual setting method, the various items of data recorded on the magnetic card 82, specifically, the partition position (Position), the conveyor speed (Speed), and the cooling temperature (Temp.), are indicated on a display device 84 by a magnetic card reader 83, and the operator then operates the continuous liquefied gas freezing device while observing this display. However, the temperature for each chamber may be determined without writing on the magnetic card 82.

Figure 4:
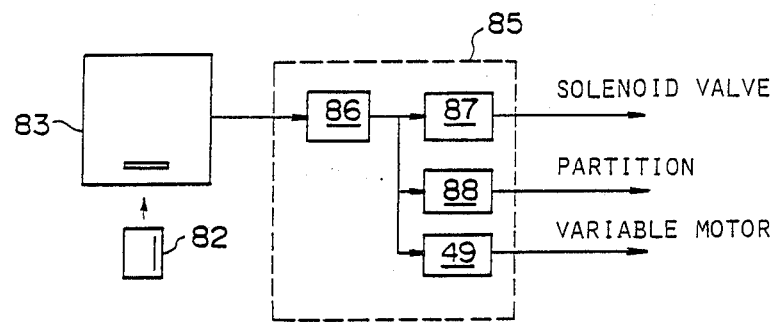

Now referring to FIG. 4, in the automatic setting method, the data written on the magnetic card 82 is read by the magnetic card reader 83 and transmitted to a controller 85 to control the continuous liquefied gas freezing apparatus. From a signal transmitted to a central control section 86, a solenoid valve control section 87 activates a partition control section 88 and a conveyor speed control section 89, to control the opening and closing of a solenoid valve 45 as shown in FIG. 1, the movement and positioning of the partition members 33, 37, 41, and the operation of the variable speed motor 23. In this case it is also possible to control the opening and closing of the solenoid valves, that is, the temperature of each chamber, separately.

The foregoing explanation was made with reference to the use of a magnetic card, but other magnetic recording media such as magnetic tape or the like, or other types of recording media can also be used.

What is claimed is:

1. An apparatus for preparing a recording medium for a freezing program by which the operating conditions of a liquefied gas freezing apparatus is controlled by changing the ambient temperature in each of a plurality of stages, comprising:

an adiabatic chamber provided with a liquefied gas spraying device, an ambient temperature sensor, and a workpiece temperature sensor;

a controller for (i) controlling the amount of a liquefied gas sprayed into the adiabatic chamber to reach a predetermined reached ambient temperature in each freezing stage in response to the temperature signals detected by the ambient temperature sensor and by the workpiece temperature sensor, and (ii) detecting the necessary elapsed time for the workpiece temperature to reach a specified temperature in each freezing stage; and a recording device which writes the data for the required time in each freezing stage detected by the controller on a program recording medium.

2. A freezing method of continuously freezing a material by changing the ambient temperature thereof in each of a plurality of stages, comprising the steps:

reading the data for the required time which is written on said recording medium obtained by the apparatus as claimed in claim 1; and controlling the freeze-processing time for said material in each stage.

* * * * *

UNITED STATES PATENT AND TRADEMARK OFFICE
CERTIFICATE OF CORRECTION

PATENT NO. : 4,934,151
DATED : JUNE 19, 1990
INVENTOR(S) : Yoshisuke SHIMA

It is certified that error appears in the above-identified patent and that said Letters Patent is hereby corrected as shown below:

Column 3, line 39, change "a" (first occurrence) to --an--.

Column 4, line 24, after "37" insert --,--;

Column 5, line 35, change " }" to --)--.

Signed and Sealed this

Seventeenth Day of December, 1991

Attest:

HARRY F. MANBECK, JR.

*Attesting Officer*  *Commissioner of Patents and Trademarks*